United States Patent
Herrera

(10) Patent No.: US 11,042,133 B2
(45) Date of Patent: Jun. 22, 2021

(54) APPARATUS AND METHOD FOR CONTROLLING A VEHICLE USING A FIRST MODEL AND A SECOND MODEL

(71) Applicant: JAGUAR LAND ROVER LIMITED, Warwickshire (GB)

(72) Inventor: Juan Herrera, Coventry (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 142 days.

(21) Appl. No.: 16/183,829

(22) Filed: Nov. 8, 2018

(65) Prior Publication Data
US 2019/0155229 A1 May 23, 2019

(30) Foreign Application Priority Data
Nov. 21, 2017 (GB) .................................... 1719326

(51) Int. Cl.
*G05B 13/04* (2006.01)
*B62D 6/00* (2006.01)
(Continued)

(52) U.S. Cl.
CPC ........... *G05B 13/048* (2013.01); *B60W 30/10* (2013.01); *B60W 30/12* (2013.01); *B60W 50/00* (2013.01);
(Continued)

(58) Field of Classification Search
CPC .... G05B 13/048; G05B 17/00; B62D 15/027; B62D 15/025; B62D 6/002; B60W 50/00;
(Continued)

(56) References Cited

U.S. PATENT DOCUMENTS

| 2008/0071469 A1* | 3/2008 | Caveney | ................ | G01C 21/20 701/501 |
| 2010/0057361 A1* | 3/2010 | Caveney | ................ | G08G 1/161 701/31.4 |

(Continued)

FOREIGN PATENT DOCUMENTS

| CN | 106696956 A | * | 5/2017 | |
| EP | 2325069 A1 | * | 5/2011 | ........... B62D 15/025 |

OTHER PUBLICATIONS

Combined Search and Examination Report under Sections 17 and 18(3) for Application No. GB1719326.9 dated May 17, 2018.

*Primary Examiner* — Kevin P Mahne
(74) *Attorney, Agent, or Firm* — Carlson, Gaskey & Olds

(57) ABSTRACT

Embodiments of the present invention provide a method of controlling a vehicle, comprising predicting a first parameter of a vehicle state at each of a plurality of points in time in dependence on a first parameter of a current vehicle state and a first model associated with the vehicle, predicting a second parameter of the vehicle state at each of the plurality of points in time in dependence on a second parameter of the current vehicle state, the predicted first parameter of the vehicle state and a second model associated with the vehicle, and determining one or more control inputs for the vehicle at each of the points in time in dependence on the predicted first and second parameters of the vehicle state at each of the plurality of points in time and desired first and second parameters of the vehicle state at each of the plurality of points in time.

19 Claims, 6 Drawing Sheets

(51) Int. Cl.
   *B62D 15/02*     (2006.01)
   *B60W 50/00*     (2006.01)
   *G05D 1/00*      (2006.01)
   *B60W 30/10*     (2006.01)
   *B60W 30/12*     (2020.01)

(52) U.S. Cl.
   CPC ........... *B62D 6/002* (2013.01); *B62D 15/025* (2013.01); *B62D 15/027* (2013.01); *G05D 1/00* (2013.01); *B60W 2050/0031* (2013.01); *B60W 2050/0033* (2013.01)

(58) Field of Classification Search
   CPC ......... B60W 50/0097; B60W 50/0098; B60W 30/0953; B60W 2050/0028; B60W 30/10; B60W 30/12; B60W 2050/0031; B60W 2050/0033; G05D 1/00; G05D 1/02; G05D 1/0088; G05D 1/0212; G05D 1/008
   See application file for complete search history.

(56)              References Cited

U.S. PATENT DOCUMENTS

2017/0120908 A1*  5/2017  Oniwa .............. B60W 50/0097
2017/0233001 A1   8/2017  Moshchuk et al.
2017/0293303 A1* 10/2017  Medagoda ........... A01B 69/008
2019/0009819 A1*  1/2019  Ishioka ................ B60W 30/10
2019/0384294 A1* 12/2019  Shashua ............... G05D 1/0088

\* cited by examiner

APPARATUS AND METHOD FOR CONTROLLING A VEHICLE USING A FIRST MODEL AND A SECOND MODEL

CROSS REFERENCE TO RELATED APPLICATION

This application claims priority to United Kingdom Application No. GB 1719326.9, filed on 21 Nov. 2017.

TECHNICAL FIELD

The present disclosure relates to apparatus and methods and particularly, but not exclusively, to apparatus and methods for controlling a process. Aspects of the invention relate to a method, to a controller, to a system, to a vehicle and to computer software.

BACKGROUND

It is necessary in many applications to control a process. The process is controlled to achieve a desired state, such as a desired temperature. An example of a process which may be controlled is a vehicle. One or more aspects of the vehicle may be controlled, such as a speed of the vehicle and a steering of the vehicle. The vehicle may be controlled to achieve a desired state from a current state of the vehicle. The current and desired states may be defined by one or more parameters of the vehicle such as a heading and a position of the vehicle.

Some control schemes are only reactive to a measured state of the process such as Proportional-Integral-Derivative (PID) control schemes. Model Predictive Control (MPC) control schemes are also known which aim to achieve the desired state of the process based on the current state by predicting one or more future states of the process. MPC control is based on a model of the process under control and information about the current state of the process. However for some processes there can be non-linearities which make calculating control inputs for the process difficult.

It is an object of embodiments of the invention to at least mitigate one or more of the problems of the prior art.

SUMMARY OF THE INVENTION

Aspects and embodiments of the invention provide a method, a controller, a system, a vehicle and computer software as claimed in the appended claims.

According to an aspect of the present invention, there is provided a method of controlling a vehicle, comprising predicting a first parameter of a vehicle state at each of a plurality of points in time in dependence on a first parameter of a current vehicle state and a first model associated with the vehicle, predicting a second parameter of the vehicle state at each of the plurality of points in time in dependence on a second parameter of the current vehicle state, the plurality of predictions of the first parameter of the vehicle state and a second model associated with the vehicle, and determining one or more control inputs for the vehicle at each of the points in time in dependence on the predictions of the first and second parameters of the vehicle trajectory at each of the plurality of points in time and desired first and second parameters of the vehicle trajectory at each of the plurality of points in time Advantageously, the use of two models may address problems associated with inter-dependence of the first and second parameters, such as non-linearities or cross-coupling.

The predicting the second parameter of the vehicle state at each of the plurality of points in time may comprise providing, as an input to the second model, the plurality of predictions of the first parameter of the vehicle state. Advantageously, providing the plurality of predictions of the first parameter of the vehicle state to the second model allow decoupling of the first and second models.

Each prediction of the first parameter of the vehicle state may be provided as an input to a trigonometric function associated with the second model. A non-linearity is associated with the trigonometric function, which is ameliorated in some embodiments by the use of first and second models.

The first parameter of the vehicle state is optionally a heading of the vehicle and the first model is a rotation model associated with the vehicle. Advantageously, the heading of the vehicle may be determined.

The second parameter of the vehicle state is optionally a position of the vehicle and the second model is a translation model associated with the vehicle. Advantageously the position of the vehicle may be determined.

The determining the one or more control inputs may comprise determining a minimisation of at least one cost function associated with the one or more control inputs. Advantageously the cost function allows the control inputs to be determined which may require least input to achieve.

The determining the minimisation of the at least one cost function optionally comprises determining a minimisation of a cost function associated with the first model. Advantageously the control inputs associated with the first model are determined.

The determining the minimisation of at least one cost function optionally comprises determining a minimisation of a cost function associated with the second model. Advantageously the control inputs associated with the second model are determined.

The cost function may comprise one or more weights. A weight may be associated with each of the control inputs. A weight may be associated with each of one or more of the parameters associated with the vehicle states. Advantageously the weights are used to determine the control inputs.

Optionally one or both of the first and second parameters of the vehicle state are predicted in dependence on respective desired first and second parameters of the vehicle state at each of the plurality of points in time. Advantageously the vehicle is controlled to achieve the desired states.

The predictions of the first and second parameters of the vehicle state at each of the plurality of points in time may be associated with respective desired states of the vehicle at each of the respective points in time. Advantageously an error may be determined associated with each point in time.

Optionally the method provides a model predictive control scheme, MPC, utilising the first and second models associated with the vehicle. Advantageously use of the MPC scheme allows knowledge of future states of the vehicle to be used to determine control inputs to the vehicle.

The rotation model may be a heading model of a kinematic vehicle model.

The position model may be a position model of a kinematic vehicle model.

According to an aspect of the present invention, there is provided a method of controlling a process, comprising determining a plurality of predictions of a first parameter of the process in dependence on a current first parameter of the process, and a first model associated with the process, determining a plurality of predictions of a second parameter of the process at each of the plurality of points in time in dependence on a current second parameter of the process, the plurality of predictions of the first parameter of the process and a second model associated with the process.

According to another aspect of the present invention, there is provided a controller, comprising input means to receive a signal indicative of a current state of a vehicle, memory means for storing first and second models associated with the vehicle, processing means arranged to predict a first parameter of a vehicle state at each of a plurality of points in time in dependence on a first parameter of the current state of the vehicle and the first model, predict a second parameter of the vehicle state at each of the plurality of points in time in dependence on a second parameter of the current state of the vehicle, the plurality of predictions of the first parameter of the vehicle state and the second model, determine one or more control inputs for the vehicle at each of the points in time in dependence on the predictions of the first and second parameters of the vehicle trajectory, and desired first and second parameters of the vehicle state at each of the plurality of points in time, and output means arranged to output one or more signals indicative of the one or more control inputs.

A controller as described above, wherein:

a. the control means is a control unit or computational device having one or more electronic processors;

b. the inputs means is an input for receiving an electrical signal; and c. the output means is an output for outputting an electrical signal.

The processing means is optionally arranged to provide, as an input to the second model, the predictions of the first parameter of the vehicle state to predict the second parameter of the vehicle state at each of the plurality of points in time.

The processing means may be arranged to provide each prediction of the first parameter of the vehicle trajectory to a trigonometric function associated with the second model.

The first parameter of the vehicle state may be a heading of the vehicle. The first model may be a rotation model associated with the vehicle.

The second parameter of the vehicle state is optionally a position of the vehicle. The second model is optionally a position model associated with the vehicle.

Optionally the processing means is arranged to determine a minimisation of at least one cost function associated with the one or more control inputs.

The processing means may be arranged to determine the minimisation of the at least one cost function comprising determining a minimisation of a cost function associated with the first model.

The processing means may be arranged to determine the minimisation of the at least one cost function comprising determining a minimisation of a cost function associated with the second model.

The cost function may comprise one or more weights each associated with one of more of the control inputs and one or more of the parameters associated with vehicle states.

The processing means is optionally arranged to determine the prediction of one or both of the first and second parameters of the vehicle state at each of the plurality of points in time, which may be associated with respective desired states of the vehicle at each of the respective points in time.

According to a still further aspect of the present invention, there is provided a system comprising a controller as described above, and control means arranged to receive the one or more signals indicative of the one or more control inputs and to control the vehicle in dependence thereon. The control means may be a control unit or computational device having one or more electronic processors for controlling the vehicle.

The control means comprises a steering control means for controlling a steering system of the vehicle. The steering control means may be a steering control unit.

A vehicle arranged to perform the method according to an aspect of the invention, comprising the controller to an aspect of the invention or the system of an aspect of the invention.

According to a still further aspect of the present invention, there is provided a computer software which, when executed by a computer, is arranged to perform a method according to an aspect of the invention. The computer software may be stored on a computer readable medium. The computer software may be tangibly stored on the computer readable medium. The computer readable medium may be non-transitory.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Embodiments of the invention will be described with reference to a vehicle and particularly to controlling a trajectory of the vehicle. It will, however, be appreciated that embodiments of the invention are not limited in this respect. Embodiments of the invention may be applied to controlling other aspects of the vehicle and, furthermore, may be applied to controlling processes more generally. In particular embodiments of the invention may be applied to controlling any process. Embodiments of the invention are particularly useful for processes for which a state space model contains non-linearities, such as cross dependencies.

Figure 1:
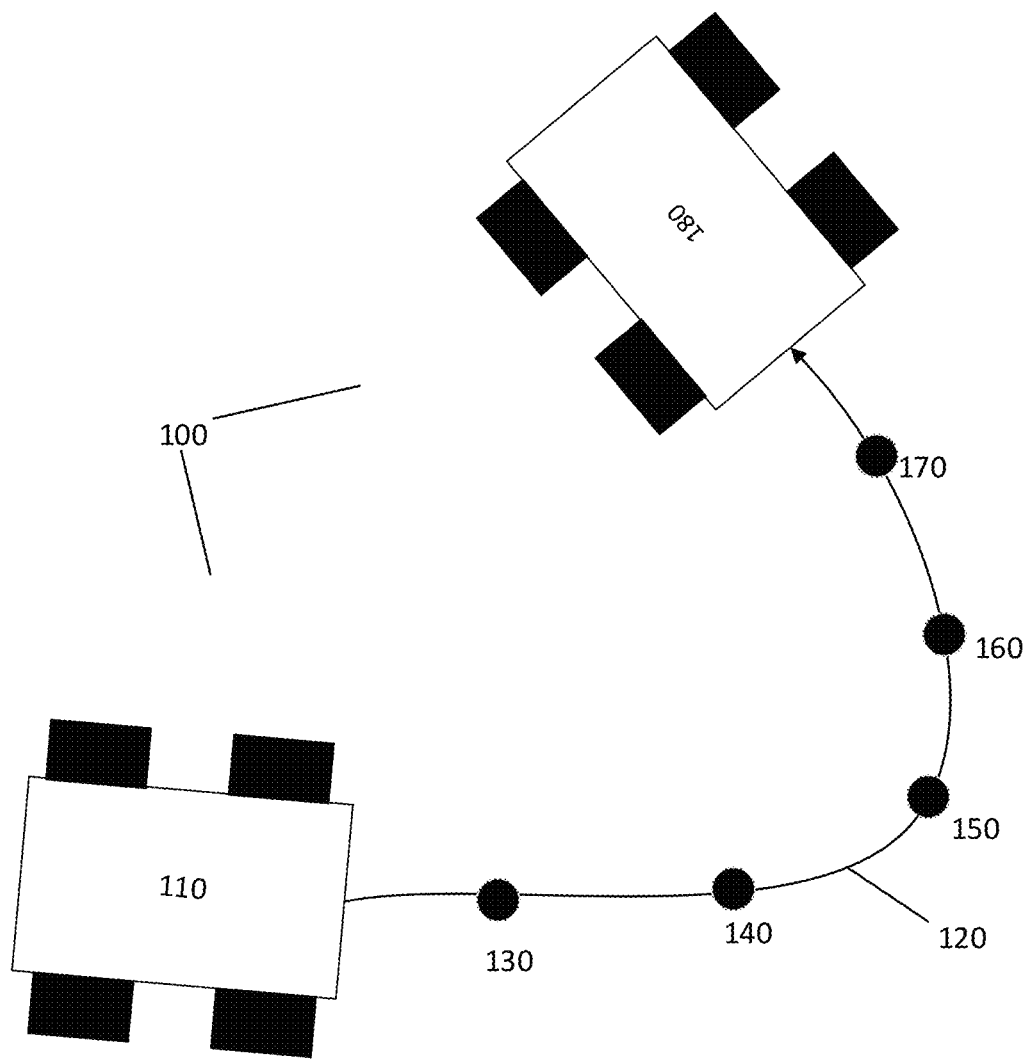
FIG. 1 shows an illustration of current and desired states of a vehicle.

Referring to FIG. 1 there is illustrated a vehicle, generally denoted as 100, illustrated at a first state 110. The first state 110 is a current state of the vehicle at a current or present point in time. For example, the current state 110 may be the vehicle 100 at a position on a navigable path, such as a roadway or other navigable area. In addition, a plurality of intended future states or desired states of the vehicle 100 are illustrated along a trajectory 120 of the vehicle 100, each indicated with a respective marker 130, 140, 150, 160, 170, 180. Each of the desired states may be a position of the vehicle 100 along the navigable path in a direction of travel, or at another position on the navigable area, such as at a parked position, for example. Other desired positions of the vehicle 100 may be envisaged. Each of the plurality of future or desired states 130, 140, 150, 160, 170, 180 of the vehicle 100 is defined respective ones of a plurality of points in time, as will be explained. A respective desired state of the vehicle 100 may be determined for each of the plurality of points in time along the trajectory 120 of the vehicle 100 with respect to the first state 110 of the vehicle 100 such as illustrated in FIG. 1. Whilst FIG. 1 illustrates six future states 130, 140, 150, 160, 170, 180 of the vehicle 100 it will be appreciated that this is merely illustrative and that other numbers of future states may be envisaged. It will be appreciated that in some embodiments a predetermined number of future states each associated with a respective future point in time are considered up to a horizon, as will be explained.

The first or current state 110 and each of the desired states 130, 140, 150, 160, 170, 180 of the vehicle 100 may each be defined by one or more parameters. The one or more parameters are each indicative of an aspect of the vehicle's state. For example, a first parameter may define the vehicle's position. For a vehicle 100 which travels on the surface of the Earth, including upon water, the position may be defined in two dimensions such as in x, y coordinates. It will be appreciated that for air-going vehicles the position may be defined in three dimensions such as x, y, z coordinates. Thus it will be appreciated that one parameter may comprise a plurality of dimensions. Although description is provided herein relating to land-going vehicles, such as wheeled vehicles, it will be appreciated that embodiments of the invention are not limited in this respect. Embodiments of the invention may be envisaged which are aircraft, such as autonomous aircraft, i.e. drones.

The state of the vehicle 100 may also be defined by a heading parameter $\theta$ which defines a direction in which the vehicle 100 is facing i.e. oriented. Particularly, although not exclusively, for vehicles not having a front face i.e. which may travel in any direction, $\theta$ may indicate the direction of travel of the vehicle 100. The state of the vehicle 100 may be defined by other parameters such as, for example V indicative of a velocity of the vehicle 100.

As noted above, in a Model Predictive Control (MPC) control scheme the current state 110 of the vehicle, as defined by X(k), i.e. at time k, and one or a plurality of desired states 130, 140, 150, 160, 170, 180, as defined by Xd, of the vehicle 100 are used to determine control inputs for the vehicle 100. In some embodiments Xd is a vector of a plurality of desired states of the vehicle at respective points in time. Considering discretised time where the current time is k and a plurality of future points in time are considered which are defined as k+1, k+2 . . . k+H, where H is a time horizon i.e. a maximum time in advance of the current time for which desired states of the vehicle 100 are considered, control inputs U to the vehicle 100 may be determined. In some embodiments U is a vector of a plurality of control inputs of the vehicle 100 at respective points in time. Between the current state 110 and the time horizon H a predetermined number of desired states 130, 140, 150, 160, 170, 180 may be determined.

FIG. 1 indicates a plurality of future states 130, 140, 150, 160, 170, 180 of the vehicle 100. For example, the state 130 may be at time k+1, state 140 and time k+2 etc. The plurality of future states 130-180 are defined along the trajectory 120 of the vehicle 100.

For a generic process, the state at k+1 in a state space representation denoted as X(k+1) is:

$$X(k+1)=A \cdot X(k)+B \cdot U$$

where U is the control input provided to the vehicle 100 and A and B are state and input matrices, respectively.

The state at k+2 can be given by:

$$X(k+2)=A \cdot X(k+1)+B \cdot U(k+1)=A^2 \cdot X(k)+A \cdot B \cdot U(k)+B \cdot U(k+1)$$

The above equations can be used to provide an estimate of future states:

$$\begin{bmatrix} X(k+1) \\ X(k+2) \\ \vdots \\ X(k+Nx) \end{bmatrix} = \begin{bmatrix} A \\ A^2 \\ \vdots \\ A^{Nx} \end{bmatrix} X(k) + \begin{bmatrix} B & 0 & 0 & \cdots \\ A \cdot B & B & 0 & \cdots \\ \vdots & A \cdot B & B & \cdots \\ \vdots & \vdots & \ddots & \vdots \\ A^{Nx-1} \cdot B & \cdots & \cdots & B \end{bmatrix} \cdot \begin{bmatrix} U(k) \\ U(k+1) \\ \vdots \\ U(k+Nx-1) \end{bmatrix}$$

Which gives:

$$X'=Z \cdot X(k)+N \cdot U'$$

Where X' is a set of future states of the vehicle 100 and U' is a set of control inputs to the vehicle 100. X' and U' define a state of the vehicle 100 and one or more control inputs at each of the plurality of points in time, respectively, Z is a function of A's and N is a function of A's and B's as in the estimate of future states, above.

Once the future states X(k+1) . . . X(k+Nx) of the vehicle 100 are determined, an optimisation step using a cost function $J_k$ may be performed, as shown below:

$$J_k = \tfrac{1}{2}[X'-Xd]^T Q[X'-Xd] + \tfrac{1}{2}U'^T R U'$$

T represents matrix transposition, as will be appreciated, and Q and R are weights which may be diagonal matrices providing a respective weight at each point in time, as below:

$$\begin{bmatrix} Q_k & 0 & 0 & \\ 0 & Q_{k+1} & 0 & \\ 0 & 0 & \ddots & \\ & & & Q_{k+Nx} \end{bmatrix} \begin{bmatrix} R_k & 0 & 0 & \\ 0 & R_{k+1} & 0 & \\ 0 & 0 & \ddots & \\ & & & R_{k+Nx} \end{bmatrix}$$

Control of the vehicle 100 may be optimised by determining a solution of:

$$\frac{dJ_k}{dU'} = 0 \Rightarrow U' = f(Z, N, Q, R, X(k), Xd)$$

Figure 2:
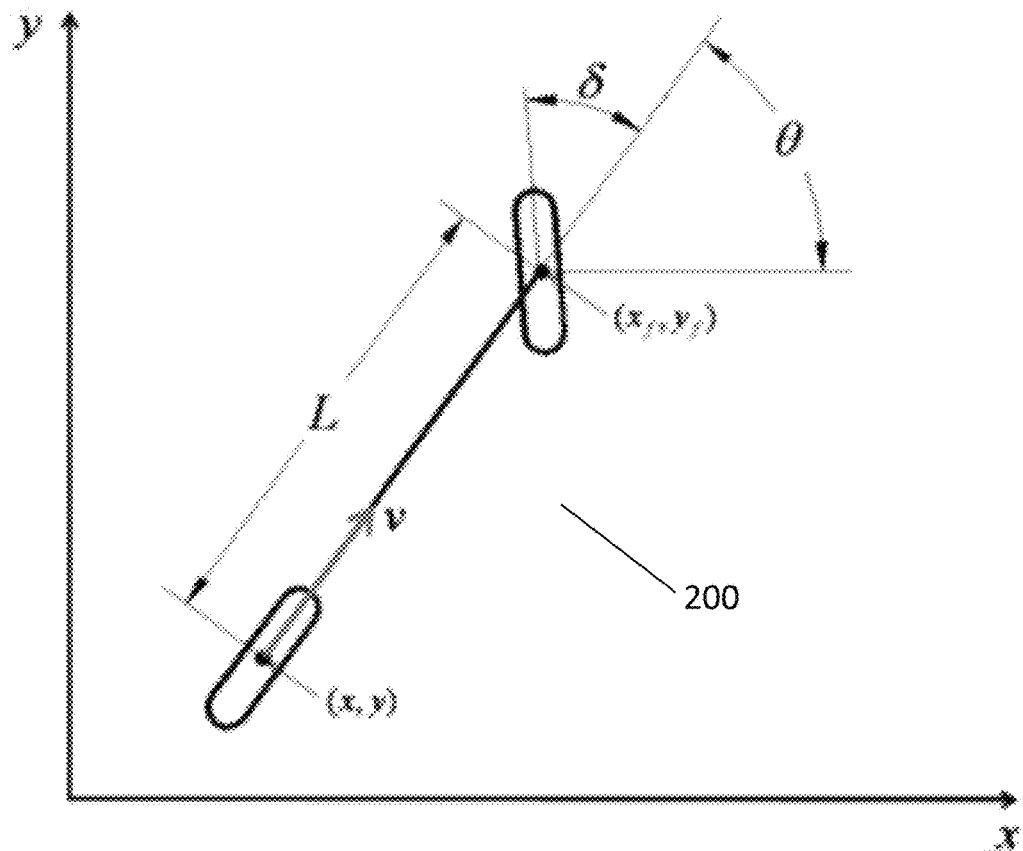
FIG. 2 shows an illustration of a vehicle model according to an embodiment of the invention.

In order to determine the control inputs U to the vehicle 100, using the MPC control scheme it is necessary to have a model of the vehicle 100. Notwithstanding a number of wheels of the vehicle, the vehicle 100 may be modelled as a kinematic bicycle model 200. An illustration of such a model is illustrated in FIG. 2. The bicycle model 200 according to an embodiment of the invention is defined by L which is a wheelbase of the bicycle i.e. length, S is a steering angle, θ is heading, v is velocity x, y and $x_f$, $y_f$ are coordinates for a position of rear and front wheels, respectively, and T is a sample time. It will be appreciated that other models, including other vehicle models, may be used and embodiments of the present invention are not limited to use of this model.

Combining the MPC scheme with the example bicycle model 200, for a position in x, y coordinates and heading θ gives:

$$\begin{cases} \dot{x} = v\cos(\theta) \\ \dot{y} = v\sin(\theta) \\ \dot{\theta} = v/L\tan(\delta) \end{cases} \Rightarrow \begin{cases} x(k+1) = x(k) + (T\cos(\theta(k)) \cdot v(k) \\ y(k+1) = y(k) + (T\sin(\theta(k)) \cdot v(k) \\ \theta(k+1) = \theta(k) + \frac{T}{L} \cdot (v(k) \cdot \tan(\delta(k))) \end{cases}$$

Where the left hand side shows a continuous time representation and the right hand side is a discrete time representation.

In state space form this gives:

$$\begin{bmatrix} x(k+1) \\ y(k+1) \\ \theta(k+1) \end{bmatrix} = \begin{bmatrix} x(k) \\ y(k) \\ \theta(k) \end{bmatrix} + \begin{bmatrix} T\cos(\theta(k)) & 0 \\ T\sin(\theta(k)) & 0 \\ 0 & \frac{T}{L} \end{bmatrix} \cdot \begin{bmatrix} v \\ v \cdot \tan(\delta) \end{bmatrix}$$

As can be appreciated, there are non-linearities in the above state space equation. In this example, these non-linearities are the inclusion of trigonometric functions and state cross dependency i.e. an inter-dependency of position on heading. Thus obtaining a solution for the model 200 is difficult and computationally expensive, which may require a more powerful computational processor in order to achieve in real-time or near real time, or may require more time to complete the computation which is undesirable for real time systems.

In embodiments of the invention, in to address at least some of the above issues, a plurality of models are used. A first model is used to determine a first parameter of a vehicle trajectory at each of a plurality of points in time. The predictions of the first parameter of the vehicle trajectory 120 at the plurality of points in time are provided to a second model which is used to predict a second parameter of the vehicle trajectory 120 at each of the plurality of points in time. Advantageously the use of two models which are cascaded in this way provides linearization to the second model. It will be noted that the first and second models are effectively parts of the vehicle model which each only partially describe the vehicle. The first and second models are provided, as will be explained, by splitting the vehicle model.

In some embodiments of the invention, the state space equation described above is divided into a plurality of parts, wherein each part corresponds to one of the models. In some embodiments, a first model is a rotation model for the vehicle 100. In some embodiments, a second model is a translation model. It will be understood that the translation model defines a translation of the vehicle's position from a previous position i.e. a translation of the vehicle's position from k to k+1. Furthermore, it will be appreciated that embodiments of the invention are not limited to the rotation and translation models.

A rotation model according to an embodiment of the invention is given by:

$$\theta(k+1) = \theta(k) + \frac{T}{L} \cdot (v \cdot \tan(\delta))(k)$$

A translation model according to an embodiment of the invention is given by:

$$\begin{bmatrix} x(k+1) \\ y(k+1) \end{bmatrix} = \begin{bmatrix} x(k) \\ y(k) \end{bmatrix} + \begin{bmatrix} T\cos(\theta(k)) \\ T\sin(\theta(k)) \end{bmatrix} \cdot v(k)$$

By considering, firstly, the rotation model, and subsequently considering the translation model it can be appreciated that the above-mentioned non-linearities are addressed. That is, by considering the vehicle model as two separate state-space equations, the predictions of one parameter from one model effectively linearizes the second state-space equation.

When the rotation model, above, is written in MPC form, the following is given:

θ(k+1 ... Nx)=Z·θ(k)+N·(v·tan(δ))(k ... k+Nx−1)

which is optimised as:

$J_k = \frac{1}{2}[X'-Xd]^T Q[X'-Xd] \frac{1}{2} U'^T R U'$

Where Xd is a set of desired trajectory headings of the vehicle 100.

Figure 3:
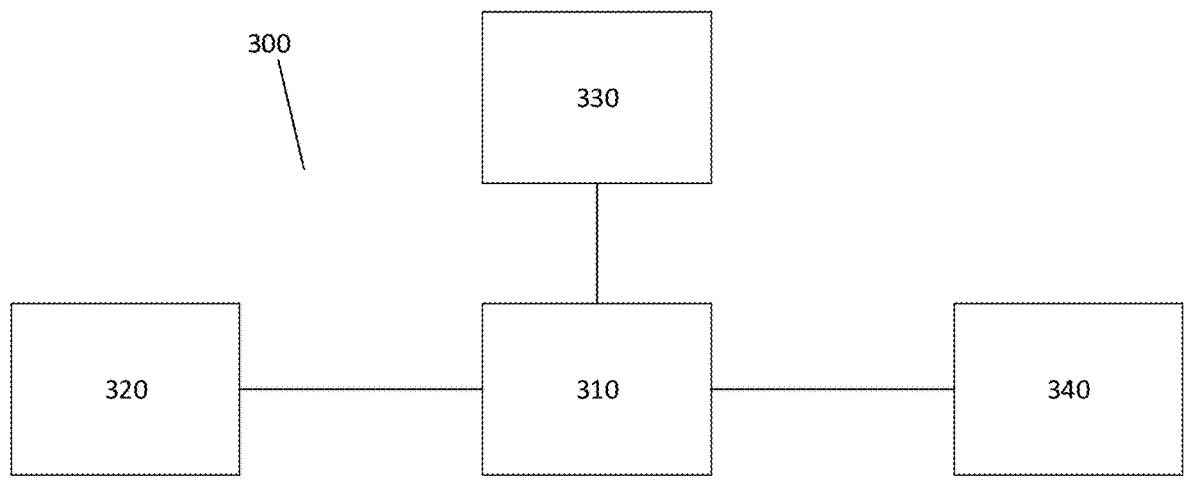
FIG. 3 shows a schematic illustration of a system according to an embodiment of the invention.

FIG. 3 illustrates a system 300 according to an embodiment of the invention which uses the above teaching. The system 300 is a system 300 for controlling a trajectory of a vehicle 100. Whilst the system 300 is described in the context of a land-going vehicle 100, it will be appreciated that, as noted above, this is not limiting.

The system 300 comprises a control means 310 according to an embodiment of the invention, current state determining means 320 for determining one or more parameters of a current state of the vehicle, desired state determining means 330 and vehicle control means 340. In more general terms the current state determining means 320 is arranged to operatively determine a current state of a process and the desired state determining means 330 is arranged to determine a desired state of the process. The vehicle control means 340 may be a means which operatively controls the process.

The control means 310 will be further described with reference to FIG. 4 which schematically illustrates an embodiment of the control means 310. The control means 310 may comprise electronic circuitry. The control means 310 may comprise one or more electronic processing devices, or processors, which operably execute computer-readable instructions. The computer-readable instructions may be stored in a memory accessible to the one or more electronic processing devices. The computer readable instructions may, when executed, cause the one or more electronic processing devices to implement a method according to an embodiment of the invention, such as that illustrated in FIG. 5. The control means 310 comprises input means to receive a signal indicative of the current state of the vehicle 100. The signal may be an electronic signal which is indicative of current state data. The current state data may be provided by the current state determining means 320. The control means 310 may comprise input means to receive a signal indicative of the desired state of the vehicle 100. The signal may be an electronic signal which is indicative of desired state data. The desired state data may be provided by the desired state determining means 330. The control means 310 comprises output means to output a signal indicative of one or more control inputs which are provided to the vehicle 100. The signal may be an electronic signal, hereinafter vehicle control signal, which is indicative of the one or more vehicle control inputs, U. The control signal may be provided to the vehicle control means 340.

The current state determining means (CSDM) 320 is arranged to, in use, determine one or more parameters of the current state of the vehicle 100. The CSDM 320 may comprise one or a plurality of devices for determining each respective parameters of the current state. The CSDM 320 may comprise a magnetometer device for determining a current heading of the vehicle 100. The current state determining means 320 may comprise a location determining device which may comprise a receiver for receiving wireless navigation signals, such as from GPS or GLONASS satellites, from which the location of the vehicle may be determined. The CSDM 320 may comprise other devices such as an altimeter device for determining an altitude of the vehicle 100, one or more scanning devices for scanning i.e. transmitting and receiving radiation from an environment of the vehicle 100, such as LIDAR. The CSDM 320 may comprise imaging means, such as one or more imaging devices, for outputting image data corresponding to the environment of the vehicle 100, such as one or more cameras. Other devices may be envisaged which are useful for determining parameters of the vehicle's current state. The CSDM 320 may output the current state data, X(k), indicative of the one or more parameters of the vehicle's current state. The current state data may be indicative of the vehicle's position or location and the vehicle's current heading.

The desired state determining means (DSDM) 330 may comprise electronic circuitry. The DSDM 310 may comprise one or more electronic processing devices, or processors, which operably execute computer-readable instructions. The computer-readable instructions may be stored in a memory accessible to the one or more electronic processing devices. The computer readable instructions may, when executed, cause the one or more electronic processing devices to determine the desired state of the vehicle 100. The desired state may be, for example, a position along a navigable path or within a navigable area, such as a road, or a parked position of the vehicle 100. Other desired states of the vehicle may be envisaged. The DSDM 330 may be provided with the current state data from the current state determining means 320. The DSDM 330 may be arranged to access digital map data, such as stored in a storage means accessible to the DSDM 330, indicative of a layout or geometry of the navigable path from which the desired state may be determined. The DSDM 330 may, for example, receive image data provided by the current state determining means 320 in order to determine a parked location of the vehicle relative to one or more obstacles in the environment of the vehicle 100, such as other parked vehicles. The DSDM 330 provides the desired state data, Xd, to the control means 310.

The vehicle control means (VCM) 340 is provided, as an input, with the vehicle control signal, U, from the control means 310. The VCM 340 comprises means for controlling the state of the vehicle 100. The VCM 340 may be arranged to influence, or control, the one or more parameters of the vehicle's state determined by the CSDM 320. For example, the VCM 340 is operative to control the heading and position of the vehicle 100. The VCM 340 may comprise means for controlling the heading of the vehicle 100, such as a steering controller. The steering controller may be associated with one or more actuators arranged to move a steering system of the vehicle, which may comprise one or more steering wheels of the vehicle 100. The VCM 340 may comprise means for controlling the position of the vehicle 100 which may comprise the steering controller and a motive controller for controlling motion of the vehicle, such as in forward and backward directions, although for some vehicles the motive controller may comprise means for controlling an altitude of the vehicle 100, such as by controlling a speed of a motor providing torque to a propeller or rotor of the vehicle.

Figure 4:
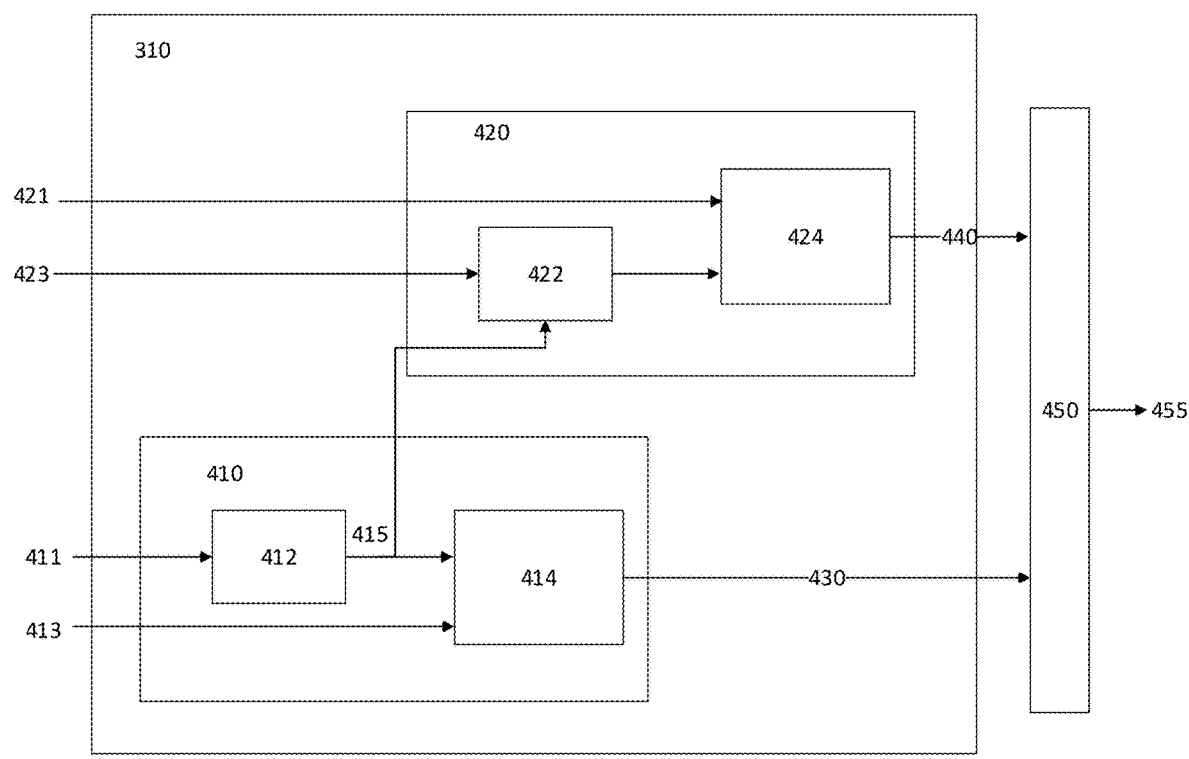
FIG. 4 shows a schematic illustration of a controller according to an embodiment of the invention.

FIG. 4 schematically illustrates functional units of the control means 310 according to an embodiment of the invention. The control means 310 comprises a first predictive control module 410 and a second predictive control module 420. The first predictive control module 410 is arranged to determine the first parameter of the vehicle trajectory 120 at each of a plurality of points in time i.e. k+1, k+2, etc. The second predictive control module 420 is arranged to determine the second parameter of the vehicle trajectory 120 at each of a plurality of points in time i.e. k+1, k+2, etc. In some embodiments, between 10 and 50 predictions of the first and second parameters may be determined, although it will be appreciated that other numbers of predictions may be determined. Furthermore, the sample time may be within a range of 0.005 to 0.08 seconds, although values outside of this range may be used dependent on characteristics of the vehicle being modelled.

The first predictive control module 410 is arranged to determine an estimate of the first parameter of the vehicle 100 state at each of the plurality of points in time 130-180 in dependence on a current state 110 of the vehicle 100 and a first model associated with the vehicle 100. The first predictive control module 410 is arranged to receive, as an input, a signal 411 indicative of at least a current first parameter associated with the current state 110 of the vehicle 100. Where the first parameter is the heading of the vehicle, the signal 411 is indicative of the current heading $\theta$ of the vehicle 100.

The first predictive control model 410 is arranged to determine one or more control inputs 430 of the vehicle 100. The one or more control inputs 430 are determined in dependence on the estimates of the first parameter of the vehicle state at each of the plurality of points in time 130-180 and desired first parameters of the vehicle trajectory 120. The first predictive control module 410 is arranged to receive, as an input, a signal 413 indicative of desired first parameters associated with the plurality of desired states 180, 130, 140, 150, 160, 170 of the vehicle 100. The signal 413 may be indicative of the desired first parameters at each of the plurality of points in time. In some embodiments, the signal 413 is a vector indicative of the desired first parameters at each of the plurality of points in time. The vector may be a vector of desired states of the vehicle 100 i.e. Xd. Where the first parameter is the heading of the vehicle, the signal 413 is indicative of the desired heading θ of the vehicle 100.

The first predictive control module 410 comprises data indicative of a first parameter model 412 of the vehicle 100. The data indicative of the first parameter model 412 may be stored in a memory associated with the first predictive control module 410. In some embodiments, the first predictive control module may comprise a first parameter prediction module comprising the first parameter model 412 for determining the estimates of the first parameter. In some embodiments, the first parameter model 412 is a rotation model 412 of the vehicle 100. The rotation model 412 may be the rotation model described above.

In dependence on the current first parameter 411 and the first parameter model 412, the first predictive control module 410 is arranged to determine the first parameter of the vehicle trajectory 120 at each of the plurality of points in time 415 i.e. k+1, k+2, etc. Thus, in some embodiments the first predictive control module 410 is arranged to determine the heading θ of the vehicle at each of the plurality of points in time 130-170, as shown in FIG. 1. It will be appreciated that these are predictions, or estimates, of the heading at each of the future points in time. A signal 415 indicative of the plurality of predictions of the first parameter is provided to the second predictive control module 420. Thus it can be appreciated that the first and second predictive control modules 410, 420 are cascaded with the plurality of predictions of the first parameter being provided to the second predictive control module 420.

The plurality of predictions of the first parameter are also provided, in some embodiments, to a first parameter optimisation module 414 of the first predictive control module 410. The first parameter optimisation module is arranged to determine at least one vehicle control parameter fin dependence on the estimates of the first parameter of the vehicle state 120 at each of the plurality of points in time. The first parameter optimisation module 414 is arranged to receive the signal 415 indicative of the plurality of predictions of the first parameter from the first parameter model 412. The first parameter optimisation module 414 is arranged to receive the signal 413 indicative of the desired first parameters at each of the plurality of points in time.

The first parameter optimisation module 414 is arranged to determine one or more control inputs 430 for reducing an error between the predictions of the first parameter and the desired first parameters. The first parameter optimisation module may determine a cost function, such as $J_k$ described above, where control inputs are determined which result in a minimum cost i.e. a cost which is below a predetermined threshold or a minima to result in the smallest error.

The first parameter optimisation module 414 is arranged to output a signal 430 indicative of at least one vehicle control parameter. In some embodiments the first parameter optimisation module is arranged to output an actuation signal for controlling at least one actuator arranged to control the vehicle 100. The actuation signal may be provided to, for example, one or more actuators arranged to control a steering system of the vehicle i.e. to control an angle of one or more steering wheels of the vehicle 100.

In some embodiments the signal is indicative of v and δ which are longitudinal and lateral control variables, respectively. The signal 413 may be indicative of:

$$v \cdot \tan(\delta)$$

The second predictive control module 420 is arranged to determine an estimate of the second parameter of the vehicle state at each of the plurality of points in time 130-180 in dependence on a current state 110 of the vehicle 100 and a second model associated with the vehicle 100. The second predictive control module 420 is arranged to receive, as an input, a signal 423 indicative of at least a current second parameter associated with the current state 110 of the vehicle 100. Where the second parameter is the position of the vehicle 100, the signal 423 is indicative of the current position of the vehicle 100.

The second predictive control model 420 is arranged to determine one or more control inputs 440 of the vehicle 100. The one or more control inputs 440 are determined in dependence on the estimates of the second parameter of the vehicle state at each of the plurality of points in time and desired second parameters of the vehicle trajectory 120. The second predictive control module 420 is arranged to receive, as an input, a signal 421 indicative of desired second parameters associated with the plurality of desired states 130, 140, 150, 160, 170, 180 of the vehicle 100. The signal 421 may be indicative of the desired second parameters at each of the plurality of points in time. In some embodiments, the signal 421 is a vector indicative of the desired second parameters at each of the plurality of points in time. The vector may be a vector of desired states of the vehicle 100 i.e. Xd. Where the second parameter is the position of the vehicle, the signal 413 is indicative of the desired position, which may be defined as position coordinates, of the vehicle 100. In some embodiments, the position coordinates are (x, y) indicative of each desired position.

The second predictive control module 410 comprises data indicative of a second parameter model 422 of the vehicle 100. The data indicative of the second parameter model 422 may be stored in a memory associated with the second predictive control module 420. In some embodiments, the second predictive control module 420 may comprise a second parameter prediction module comprising the second parameter model 422 for determining the estimates of the second parameter. In some embodiments, the second parameter model 412 is a position model 422 of the vehicle 100. The position model 422 may be the position model described above.

In dependence on the current second parameter 421 and the second parameter model 422, the second predictive control module 420 is arranged to determine the second parameter of the vehicle trajectory 120 at each of the plurality of points in time i.e. k+1, k+2, etc. Thus, in some embodiments the second predictive control module 420 is arranged to determine the position of the vehicle 100 at each of the plurality of points in time 130-180, as shown in FIG. 1. It will be appreciated that these are predictions, or estimates, of the vehicle's position at each of the future points in time. The position of the vehicle 100 may be defined as position coordinates of the vehicle 100 at each point in time. In some embodiments the position coordinates are (x, y) indicative of each desired position. In some embodiments, the position coordinates are relative to the current position 110 of the vehicle 100. The second parameter model 422 is arranged to output a signal 425 indicative of the plurality of predictions of the second parameter.

The plurality of predictions of the second parameter are also provided, in some embodiments, to a second parameter optimisation module 424 of the second predictive control module 420. The second parameter optimisation module 424 is arranged to determine at least one vehicle control parameter in dependence on the estimates of the second parameter of the vehicle state at each of the plurality of points in time. The second parameter optimisation module 424 is arranged to receive the signal 415 indicative of the plurality of predictions of the second parameter from the second parameter model 422.

The second parameter optimisation module 424 is arranged to determine one or more control inputs 440 for reducing an error between the predictions of the second parameter and the desired second parameters. The second parameter optimisation module may determine a cost function, such as $J_k$ described above, where the one or more control inputs are determined which result in a minimum cost i.e. a cost which is below a predetermined threshold or a minima to result in the smallest error.

The second parameter optimisation module 424 is arranged to output a signal 440 indicative of at least one vehicle control parameter. In some embodiments the second parameter optimisation module is arranged to output an actuation signal 440 for controlling at least one actuator arranged to control the vehicle 100.

In some embodiments the signal 440 is indicative of v which is the longitudinal control variable.

In some embodiments, the control means 310 comprises a control variable determining means (CVDM) 450. The CVDM 450 is arranged to determine one or more control variables of the vehicle 100. The CVDM 450 may be arranged to output a signal 455 indicative of the one or more control variables. In some embodiments, the CVDM 450 is arranged to determine first and second control variables which may be a longitudinal control variable V and a lateral control variable δ of the vehicle 100.

The CVDM 450 is arranged to receive the signals 430, 440 from the first and second parameter predictive control modules 410, 420, respectively. In some embodiments, the longitudinal control variable V and the lateral control variable δ of the vehicle 100 may be determined as:

$$V = v$$

and $$\delta = a\tan\frac{v \cdot \tan(\delta)}{v}$$

The CVDM 450 may output a vehicle control signal 455 indicative of the determined vehicle control variables.

Figure 5:
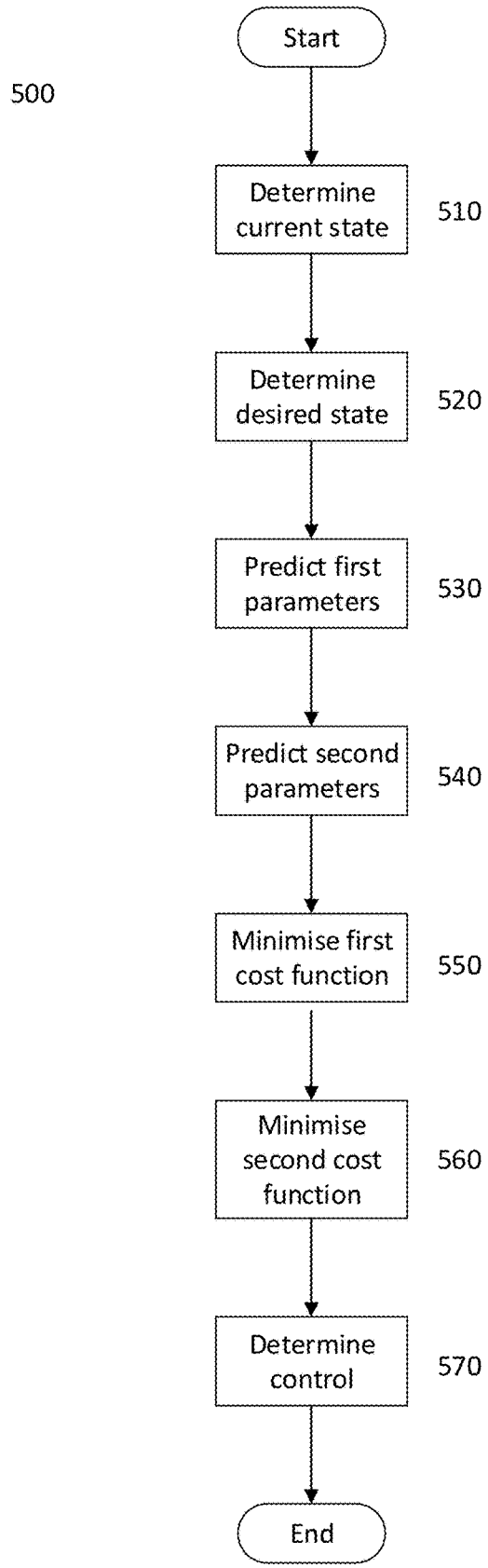
FIG. 5 shows a method according to an embodiment of the invention.

Referring to FIG. 5, there is illustrated a method 500 according to an embodiment of the invention. FIG. 5 illustrates a method 500 of controlling a vehicle according to an embodiment of the invention. It will be appreciated that a method of controlling a process according to an embodiment of the invention may comprise equivalent steps. The method 500 may be performed by the system 300 according to an embodiment of the invention described above in connection with FIGS. 3 and 4. Whilst steps forming the method 500 are described in a particular order, it will be appreciated that steps may be performed in a different order than that described. For example, step 530 may be performed before or in parallel with step 520.

The method 500 comprises a step 510 of determining a current state of the vehicle 100. In step 510 the current state of the vehicle may be determined by the CSDM 320 determining the current state of the vehicle 100 with respect to an environment of the vehicle 100. For example, the CSDM 320 may receive wireless navigation signals to determine the location of the vehicle 100. The CSDM 320 may receive radiation from the environment of the vehicle 100, which may be reflected from objects in the vicinity of the vehicle 100. Step 510 comprises in some embodiments determining first and second parameters, in some embodiments, associated with the current state 110 of the vehicle 100. The first and second parameters may be a rotation and a position of the vehicle 100.

The method 500 comprises a step 520 of determining desired states of the vehicle 100. In step 520 the desired state of the vehicle may be determined by the DSDM 330. The desired state of the vehicle 100 may be determined with respect to the environment of the vehicle 100 i.e. the desired states of the vehicle 100 may be determined as a location of the vehicle with respect to the environment at each of a plurality of points in time. The desired states of the vehicle 100 may be determined in dependence on the current state of the vehicle 100, such as desired future locations of the vehicle 100 based on the current location of the vehicle 100. Each desired state of the vehicle at a respective point in time may be associated, in some embodiments, with desired first and second parameters of the vehicle 100. The first and second parameters may be a rotation and a position of the vehicle 100.

In step 530 of the method 500, a first parameter of the vehicle trajectory 120 is determined at each of the plurality of points in time. The first parameter of the vehicle trajectory is determined, in some embodiments, in dependence on a current state 110 of the vehicle 100, and a first model associated with the vehicle 100 as described above in connection with FIG. 4. The first parameter of the vehicle trajectory 120 is determined at each of the plurality of points in time i.e. k+1, k+2, etc. in step 530. The first parameter may be a rotation of the vehicle 100, as discussed above. Thus in step 530 the first parameter is estimated at each of the future points in time in dependence on the current state 110.

In step 540 of the method 500, a second parameter of the vehicle trajectory 120 is determined at each of the plurality of points in time. The second parameter of the vehicle trajectory is determined, in some embodiments, in dependence on the current state 110 of the vehicle 100, the plurality of predictions of the first parameter determined in step 530, and a second model associated with the vehicle 100 as described above in connection with FIG. 4. The second parameter of the vehicle trajectory 120 is determined at each of the plurality of points in time i.e. k+1, k+2, etc. in step 540. The first parameter may be a rotation of the vehicle 100, as discussed above. Step 540 may comprise receiving the plurality of predictions of the first parameter as determined in step 530. Thus in step 540 the second parameter is estimated at each of the future points in time in dependence on the current state 110.

In step 550 a first cost function associated with the predicted and desired first parameters of the vehicle may be minimised. Step 550 may utilise the first parameter estimated at each of the future points in time in step 530 and the desired first parameter of the vehicle 100 at each of the future points in time as determined in step 520. Step 550 may comprise determining v and δ which are longitudinal and lateral control variables, respectively, as described above. Step 550 may determine, in some embodiments v·tan(δ) is determined.

In step 560 a second cost function associated with the predicted and desired second parameters of the vehicle may be minimised. Step 550 may utilise the second parameter estimated at each of the future points in time in step 540 and the desired second parameter of the vehicle 100 at each of the future points in time as determined in step 520. Step 550 may comprise determining v in some embodiments.

In some embodiments, the method 500 comprises a step 570 of determining one or more vehicle control inputs. Step 570 may comprise receiving v·tan(δ) and v in some embodiments. In dependence thereon, V and δ may be determined as V=v and $$\delta = a\tan\frac{v \cdot \tan(\delta)}{v}$$

as described above.

It has been observed that when controlling some vehicles a delay is observed between an application of a control input and a response of the vehicle, such as to a steering input. The delay has been observed to be around 0.2 seconds to around 0.8 seconds at low speeds, although it will be appreciated that these delays are merely illustrative. Advantageously the models used in embodiments of the invention may include a delay to more accurately model the vehicle 100.

A rotation model including a delay according to an embodiment of the invention may be:

$$\theta(k+\text{delay}) = \theta(k+\text{delay}-1) + \frac{T}{L} \cdot (v \cdot \tan(\delta))(k) \Rightarrow \theta(k+1) =$$
$$\theta(k) + \frac{T}{L} \cdot (v \cdot \tan(\delta))(k-\text{delay}+1)$$

In some embodiments, a value of delay may be determined in dependence on a speed of the vehicle 100.

Use of such a model provides:

$$\begin{bmatrix} \theta(k+1) \\ \theta(k+2) \\ \vdots \\ \vdots \\ \theta(k+Nx) \end{bmatrix} = \theta(k) + N \cdot \begin{bmatrix} U(k-\text{delay}+1) \\ U(k-\text{delay}+2) \\ \vdots \\ U(k) \\ \vdots \\ U(k+Nx-1) \end{bmatrix}$$

Where U(k) is a control input at a present time k and control inputs U(k-delay+1), U(k-delay+2) etc are previously applied control inputs.

Figure 6:
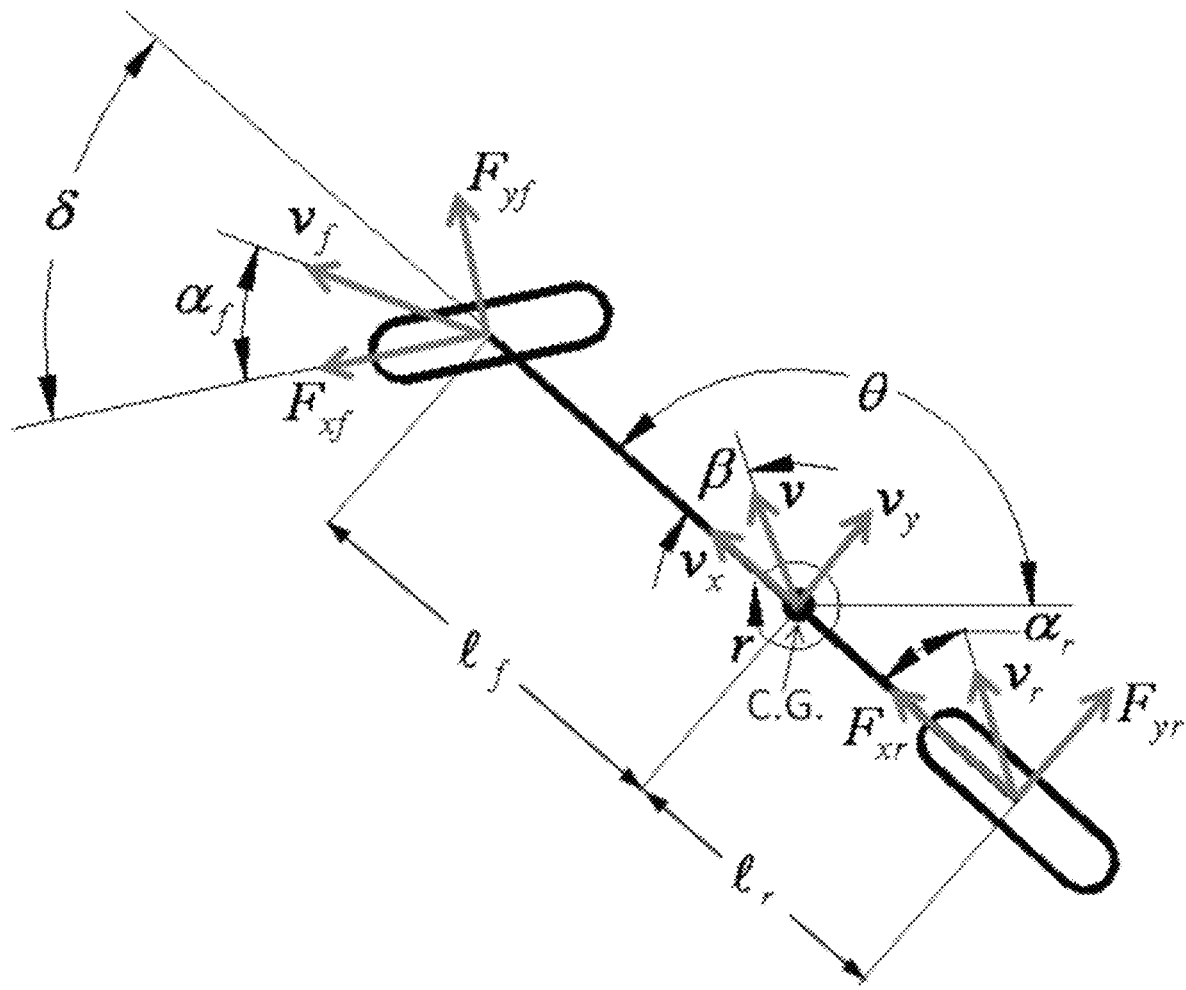
FIG. 6 shows an illustration of a further vehicle model according to an embodiment of the invention.

FIG. 6 illustrates a further vehicle model according to a further embodiment of the invention. The vehicle model illustrated in FIG. 6 is a dynamic vehicle model which includes one or more parameters associated with movement of the vehicle. The model illustrated in FIG. 6 may include those parameters of the model shown in FIG. 2. The model illustrated in FIG. 6 comprises the following parameters, with it being appreciated that not all embodiments of the model include all of said parameters:

$I_f$ which is a distance from a centre of gravity (CG) to a front axle;
$I_r$ which is a distance from the CG to a rear axle;
$v_x$ which is velocity in the x axis;
$v_y$ which is velocity in they axis;
$F_{xr}$ which is force at the rear axle in the x axis;
$F_{yr}$ which is force at the rear axle in they axis;
$\alpha_f$ which is front slip angle;
$\alpha_r$ which is rear slip angle;
$F_{xf}$ which is force at the front axle in the x axis;
$F_{yf}$ which is force at the front axle in the y axis;
β which is an angle between direction of travel and vehicle;
θ which is heading;
C.G. which is the CG;
r which is yaw rate.

Figure 7:
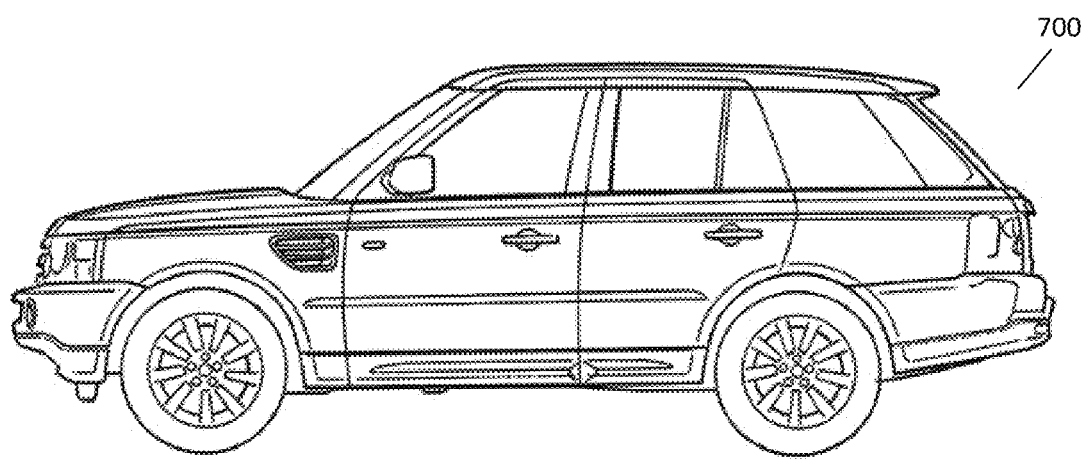
FIG. 7 a vehicle according to an embodiment of the invention.

FIG. 7 illustrates a vehicle 700 according to an embodiment of the invention. The vehicle 700 may be arranged to perform a method according to an embodiment of the invention and/or to comprise a controller 310 according to an embodiment of the invention.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of controlling a vehicle, comprising:
predicting a first parameter of a vehicle state at each of a plurality of points in time in dependence on a current first parameter of the vehicle state and a first model of the first parameter of the vehicle state;
predicting a second parameter of the vehicle state at each of the plurality of points in time in dependence on a current second parameter of the vehicle state, the plurality of predicted first parameters of the vehicle state and a second model of the second parameter of the vehicle state; and
determining one or more control inputs for the vehicle at each of the points in time in dependence on the predicted first and second parameters of the vehicle state at each of the plurality of points in time and desired first and second parameters of the vehicle state at each of the plurality of points in time.

2. The method of claim 1, wherein predicting the second parameter of the vehicle state at each of the plurality of points in time comprises providing, as an input to the second model, the predicted first parameters of the vehicle state.

3. The method of claim 2, wherein each prediction of the first parameter of the vehicle state is provided as an input to a trigonometric function associated with the second model.

4. The method of claim 1, wherein the first parameter of the vehicle state is a heading of the vehicle and the first model is a rotation model associated with the vehicle.

5. The method of claim 1, wherein the second parameter of the vehicle state is a position of the vehicle and the second model is a translation model associated with the vehicle.

6. The method of claim 1, wherein determining the one or more control inputs comprises determining a minimisation of at least one cost function associated with the one or more control inputs.

7. The method of claim 6, wherein determining the minimisation of the at least one cost function comprises determining a minimisation of a cost function associated with at least one of the first model and the second model.

8. The method of claim 6, wherein the cost function comprises one or more weights each associated with one or more of the control inputs and one or more of the parameters.

9. The method of claim 1, wherein one or both of the first and second parameters of the vehicle state are predicted in dependence on respective desired first and second parameters of the vehicle state at each of the plurality of points in time.

10. The method of claim 1, wherein the predicted first and second parameters of the vehicle state at each of the plurality of points in time are associated with respective desired states of the vehicle at each of the respective points in time.

11. The method of claim 1, wherein the method provides a model predictive control scheme, MPC, utilising the first and second models associated with the vehicle.

12. A non-transitory, computer-readable storage medium storing instructions thereon that when executed by one or more processors causes the one or more processors to carry out the method of claim 1.

13. A controller, comprising:
an input configured to receive a signal indicative of a current state of a vehicle;
a memory configured to store a first model of a first parameter of the vehicle state and a second model of a second parameter of the vehicle state;
an electronic processor configured to:
predict a first parameter of a vehicle state at each of a plurality of points in time in dependence on a current first parameter of the vehicle state and the first model;
predict a second parameter of the vehicle state at each of the plurality of points in time in dependence on a current second parameter of the vehicle state, the predicted first parameters of the vehicle state and the second model; and
determine one or more control inputs for the vehicle at each of the points in time in dependence on the predicted first and second parameters of the vehicle state, and desired first and second parameters of the vehicle state at each of the plurality of points in time; and
an output for outputting one or more signals indicative of the one or more control inputs.

14. The controller of claim 13, wherein the electronic processor is configured to provide, as an input to the second model, the predicted first parameters of the vehicle state to predict the second parameter of the vehicle state at each of the plurality of points in time.

15. The controller of claim 13, wherein the first parameter of the vehicle state is a vehicle trajectory and the electronic processor is configured to provide each predicted first parameter of the vehicle trajectory to a trigonometric function associated with the second model.

16. The controller of claim 13, wherein the first parameter of the vehicle state is a heading of the vehicle, the first model is a rotation model associated with the vehicle, the second parameter of the vehicle state is a position of the vehicle and the second model is a position model associated with the vehicle.

17. The controller of claim 13, wherein the electronic processor is configured to predict one or both of the first and second parameters of the vehicle state at each of the plurality of points in time associated with respective desired states of the vehicle at each of the respective points in time.

18. A system comprising:
the controller of claim 13; and
a steering control configured to receive the one or more signals indicative of the one or more control inputs and to control the vehicle in dependence on the received one or more signals.

19. A vehicle comprising the controller of claim 13.

* * * * *